June 7, 1966   R. E. NOVKOV   3,254,392
INSERT BIT FOR CUTOFF AND LIKE TOOLS
Filed Nov. 13, 1963   2 Sheets-Sheet 1

INVENTOR.
RAYMOND E. NOVKOV
BY
ATTORNEY

June 7, 1966 R. E. NOVKOV 3,254,392
INSERT BIT FOR CUTOFF AND LIKE TOOLS
Filed Nov. 13, 1963 2 Sheets-Sheet 2
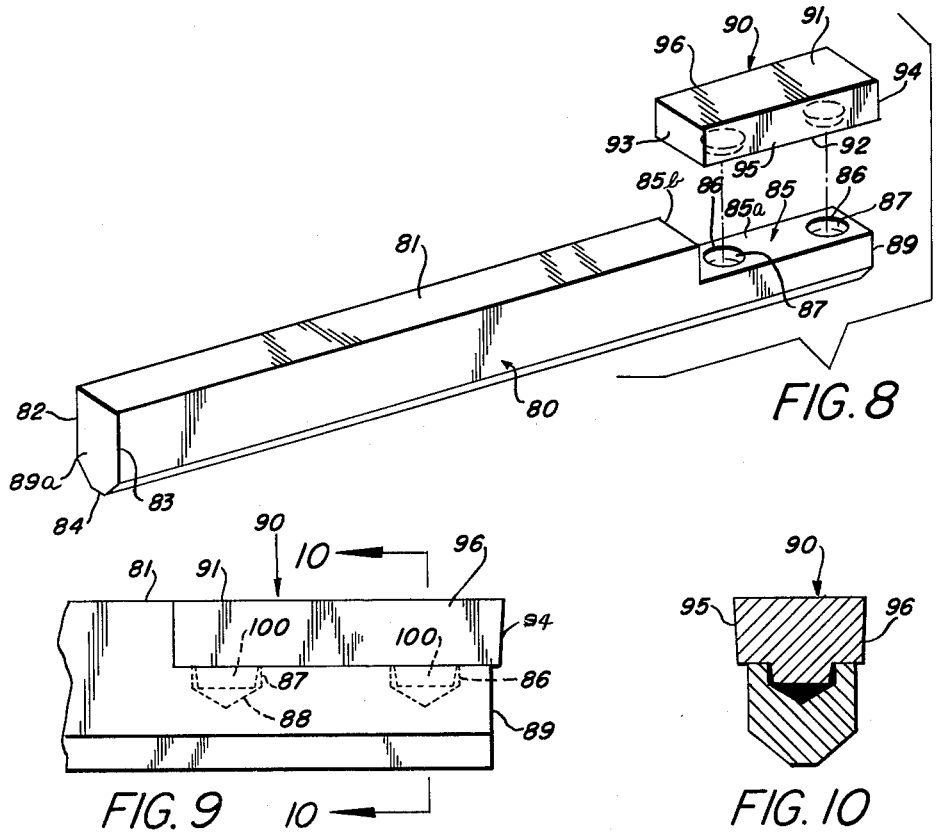
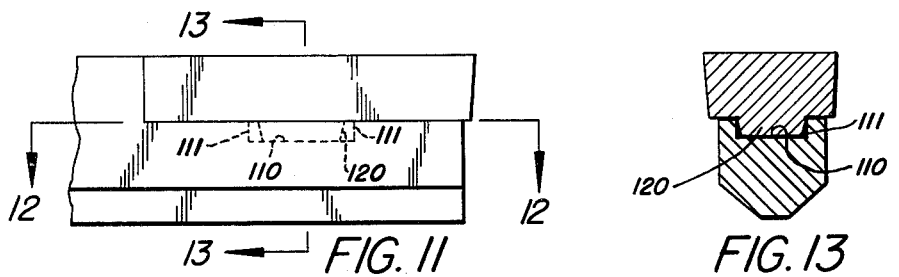
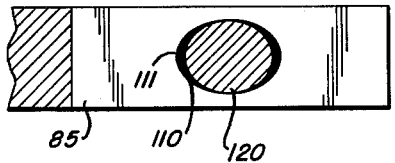
INVENTOR.
RAYMOND E. NOVKOV
BY
*J. William Freeman*
ATTORNEY United States Patent Office 3,254,392
Patented June 7, 1966

3,254,392
INSERT BIT FOR CUTOFF AND LIKE TOOLS
Raymond E. Novkov, Cuyahoga Falls, Ohio, assignor, by mesne assignments, to The Warner & Swasey Company, a corporation of Ohio
Filed Nov. 13, 1963, Ser. No. 335,449
5 Claims. (Cl. 29—95)

This application is a continuation-in-part of applicant's copending application Serial No. 797,254, filed March 4, 1959, now abandoned.

This invention relates to the art of metal working tools and in particular relates to the provision of an improved type of insert bit having particular use in connection with cutoff tools.

It has been long known in the prior art that a length of work can be cut or trimmed into a shorter length during the supported rotational movement thereof by the application of a cutting tool against the rotating external surface of the work. In the great majority of cases, such cutoff operations are effectuated by the use of a lathe, with the work being rotatably supported about its central axis over the lathe bed, while the cutoff tool is secured to the cross slide carriage so as to move transversely of the lathe bed and thus engage the rotating work surface.

In applicant's prior U.S. Patent 2,737,705, as well as in applicant's copending applications Serial No. 505,488, filed May 2, 1955, and now U.S. Patent 2,846,756, and Serial No. 733,590, filed May 7, 1958, and now U.S. Patent 2,964,833, there has been disclosed an improved type of insert bit having particular utility in connection with such cutoff operations.

Basically, the insert bit of the above referred to copending applications envisions an elongate shank member, having brazed thereto for coextensive projection therefrom, a carbide cutting tip, with certain of the walls of the shank and bit being substantially coplanar so as to permit progressive advancing of the cutting bit into the rotating work surface, while insuring full support thereof on opposed planar surfaces.

While the above insert bit has been satisfactory in most respects, it has been found that the same is possessed with certain disadvantages.

First, it will be noted that the insert bit is manufactured by brazing together opposed planar surfaces that are normally disposed at right angles to the elongate wall surfaces of the shank and bit. Thus, in the past, a minimal amount of surface area has been provided for brazing. As a result of this minimal amount of wall surface employed, it has been found that these insert bits are sometimes subject to failure, as by breaking at the point of brazing, under abnormal loads that are transversely applied adjacent the cutting tip. This is believed to occur because of the fact that in these cases, there is no longitudinal support provided other than the support afforded by the connection between the brazed surfaces.

As a still further disadvantage of the insert bit taught by the above referred to copending applications, secondly, it has been necessary in such instances to completely finish and machine the assembled insert bit after the completion of the brazing operation. This is necessary because of the fact that it is impossible, from a production standpoint, to properly align the parts during brazing, with the result that the planar wall surfaces are often offset with respect to each other, with the result that the same must be machined before a finished insert bit is provided.

More specifically, it has been found that the above disadvantages can be cured by providing a peg member that projects longitudinally from one end of either the shank or bit for reception within an appropriately contoured socket that is provided in one longitudinal end of the remaining bit or shank as the case may be. In this fashion, upon positioning of the pin or peg member in the socket, the parts will be properly aligned so that upon brazing in this aligned condition, the majority of finished machining operations will be eliminated, with machining of only the top and front surfaces generally being required for the purpose of providing a cutting edge.

Additionally, it will be seen that this structure provides an additional area of brazing contact, with it being contemplated that brazing preferably will also occur between the pin and socket as well as between the wall surfaces involved.

In addition to providing an increased surface area for brazing as just described, it is believed apparent that the longitudinally projecting pin will also provide additional longitudinal support, with the result that a more rigid insert bit will be provided that will be enabled to withstand greater amounts of end pressure transversely applied against the cutting tip.

In practice, equal results have been obtained regardless of whether the pin is provided on the shank or the tip but from a machining and production standpoint, more practical results occur when the pin is formed on the steel shank and the socket, slot or recess for the same is provided on the cutting tip. This is true because the carbide tip is normally cast and the socket can be incorporated therein during such casting, while the machining of a pin on the projecting end of the shank member is a relatively simple machine operation.

It has also been discovered that the above advantages can be further employed in connection with a structure wherein the cutting insert is inlaid into an appropriate recess that is cut from the top and front portions of the shank, with the pin and socket arrangement again serving to properly locate the insert both longitudinally and transversely with respect to its proper point of support on the shank.

It has also been discovered that the interlocking principles above discussed can be utilized in connection with the production of an insert bit wherein the steel shank is cut away and provided with a cutting tip that is of appropriate size to be received within such cut-out portion so as to produce a cutting tool utilizing a less amount of carbide.

It has also been discovered that in connection with the construction of such a cutting tool as above described, there is a difference in the ratio of expansion of different grades of carbide members during brazing, with certain carbides expanding to a greater degree than do others. It has accordingly been discovered that by providing the socket members on the shank slightly oversize with respect to the pin members of the carbide inlay, that self-aligning of a wide range of carbides of varying grades will occur during the brazing operation, to thus achieve the desired result of added strength, while simultaneously achieving self-alignment of the cutting tip with respect to the supporting shank.

It accordingly becomes the principal object of this invention to provide an improved type of cutoff tool, characterized in particular by the provision of a mechanical interlock at the brazed longitudinal ends of a shank and bit.

It is a still further object of this invention to provide an insert bit of the type above described with a minimal amount of cost.

Other objects of the invention will become more apparent upon a reading of the following brief specification, considered and interpreted in the light of the accompanying drawings.

Of the drawings:
FIGURE 1 is a perspective view of the improved insert bit and showing a shank having cutting tips fused to both longitudinal ends thereof.

FIGURE 8 is an exploded perspective view of a modified form of the invention.

FIGURE 9 is a side elevational view of the modification of FIGURE 8, with the insert having been positioned, but not as yet having been brazed to the shank.

FIGURE 10 is a sectional view taken on the line 10—10 of FIGURE 9 and showing the condition of the component parts after brazing.

FIGURE 11 is a side elevational view of a still further modified form of the invention and showing the insert being positioned in assembled relationship with respect to the shank, but with the parts being shown in their condition prior to brazing.

FIGURE 12 is a sectional view taken on the lines 12—12 of FIGURE 11.

FIGURE 13 is a sectional view taken on the lines 13—13 of FIGURE 11, but showing the condition of the component parts after brazing.

Figure 1:
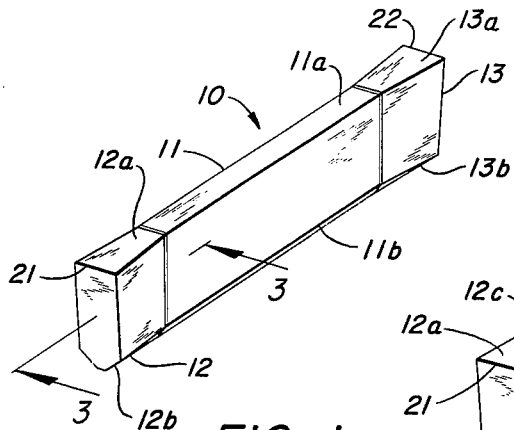
Figure 2:
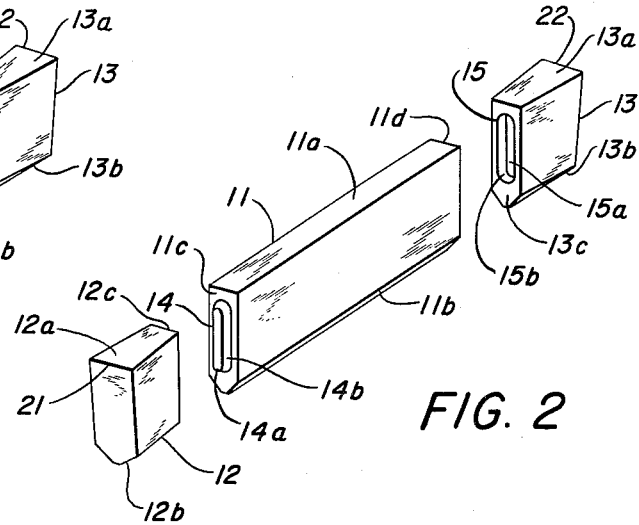
FIGURE 2 is an exploded perspective view of the improved insert bit shown in FIGURE 1.
Figure 3:
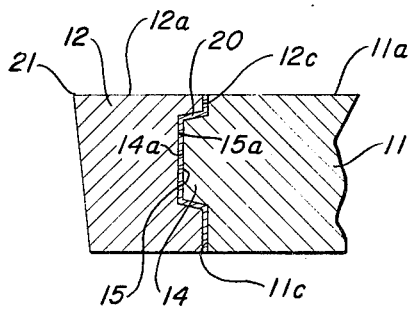
FIGURE 3 is a sectional view taken on the lines 3—3 of FIGURE 1.

Referring now to the drawings and in particular to FIGURES 1 through 3 thereof, the improved insert bit, generally designated by the numeral 10, is shown including a shank 11, and spaced cutting tips 12 and 13 that are fused to the longitudinal ends of the member 11 so as to provide a double ended insert bit 10.

In this regard, the shank 11 is normally made of steel, while the cutting tips 12 and 13 are preferably made of carbide for the purpose of effectuating more efficient cutting operations.

As shown best in FIGURES 1 and 2, the shank 11 and cutting tips 13 and 12 include top surfaces 11a, 12a and 13a, respectively, with these three surfaces being preferably aligned in coplanar, coextensive relationship with each other as shown in FIGURE 1. Similarly, V-shaped bottom surfaces 11b, 12b, and 13b are provided, as are opposed side planar surfaces that interconnect the top surfaces with the V-shaped bottom surfaces just described.

Additionally, and as described in applicant's copending applications, the cutting tips 12 and 13 each flare outwardly from the point of juncture with shank 11 to define maximum width cutting edges 21 and 22, with substantially all portions of the bit preferably having a greater transverse width than shank 11. In this fashion, the steel shank 11 can be extruded, while the tips 12 and 13 can be cast with tapering sidewalls to thus avoid excessive cost in manufacture.

For the purpose of providing an improved type of connection between the shank 11 and cutting tips 12 and 13, the shank 11 includes opposed planar longitudinal end surfaces 11c and 11d, each of which are provided with a projecting pin or peg member 14, as shown best in FIGURE 2 of the drawings, wherein the projecting pin 14 for surface 11c is clearly illustrated. It is to be understood that a similar pin 14 projects from surface 11d.

The pin members 14 normally have a projecting planar end surface 14a, as well as an endless tapering surface 14b that connects the surface 14a with planar end surface 11c or 11d, as the case may be. Generally, and as shown in FIGURE 1, the pin 14 is of a non-circular configuration so as to provide flat surfaces which will obviate relative rotation of the cutting tips 12 and 13 about the axis of the pin 14 when the pins 14 are positioned within either socket 15, as will now be described.

Accordingly, and to this end, each cutting bit 12 and 13 includes a socket 15 that extends inwardly from the planar end faces 12c and 13c of the cutting tips 12 and 13 respectively. A bottom surface 15a and a tapered wall surface 15b are defined by each socket or slot 15 so that the surfaces 14a and 14b of each pin 14 may be aligned with the surfaces 15a and 15b of each socket 15, as shown best in FIGURE 3 of the drawings.

In this regard, FIGURE 3 shows the preferred use of the brazing material 20 between the complementally aligned surfaces of shank 11 and cutting tip 12, and it is to be understood that silver solder or other brazing alloys or compounds could be used to effectuate the brazed connection shown in FIGURE 3.

In manufacture of the improved insert bit, the shank 11 will first be machined to the contour shown in FIGURE 2, with the projecting pins 14, 14 being machined on each face 11c and 11d thereof in known fashion. Preferably, and as indicated previously, the cutting tips 12 and 13 will be cast of carbide, with the sockets or slots 15, 15 thereof being formed during manufacture. When the component parts are assembled, it will be seen that an individual cutting tip 12, for example, can be positioned in alignment with the shank 11 by aligning the socket 15 thereof about a projecting pin 14, followed by brazing of the parts together while in aligned condition. When both cutting ends 12 and 13 have been secured with respect to the shank 11, the top surfaces 11a, 12a, and 13a can be machined in unison, as can the projecting end surfaces 12d and 13d of the cutting tips 12 and 13, respectively. In this fashion, cutting edges indicated by the numerals 21 and 22 will be provided at the longitudinal extremities of the insert bit 10.

The assembled tool can then be used in known fashion in connection with a cutoff tool of the type described in applicant's above referred to copending applications.

Figure 4:
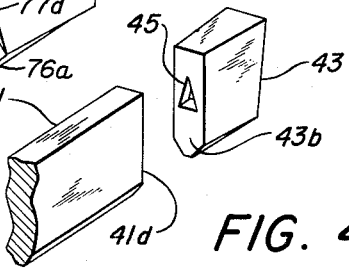
FIGURES 4 and 5 are perspective exploded views showing modified forms of the invention.

In the modified form of the invention shown in FIGURE 4, the cutting tip 43 is shown designed for projecting engagement with respect to a shank 41, with shank 41 and tip 43 corresponding in outline contour to shank 11 and tip 13 that have been previously described in connection with FIGURES 1 through 3 of the drawings.

In this case, however, the face 43b of tip 43 is provided with a triangular shaped tapering recess 45, with it being understood that a complementally shaped and contoured pin (not shown) projects from the end face 41d of the shank 41. Complemental engagement of this triangular shaped pin within recess 45, followed by brazing, will result in production of an insert bit as before.

Figure 5:
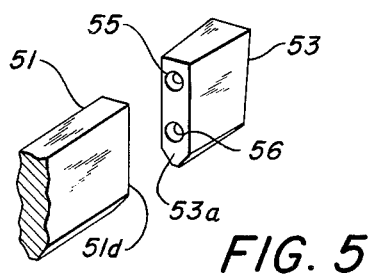

In like fashion, and with regard to the modification shown in FIGURE 5, a pair of axially tapering bores 55 and 56 are provided on the end surface 53d of shank 53, with these tapering bores 55 and 56 receiving complementally shaped projecting tapering pins (not shown) that project from end surfaces 51d of shank 51. Again shank 51 and tip 53 are similar in outline contour except for the changes above noted.

Figure 6:
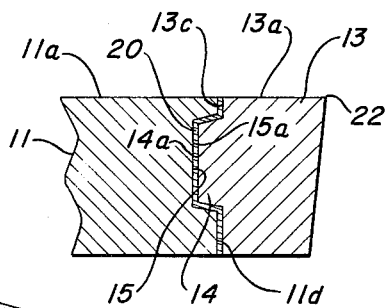
FIGURE 6 is a sectional view of a modified form of the invention.

In the modification of FIGURE 6, there is illustrated a reversal of the interlock form shown in connection with FIGURES 1 through 3 and, accordingly, the pin 14 projects from the carbide insert 13 for reception within a socket 15 that is provided in the end face 11d of shank 11. Brazing as before completes the insert bit shown in FIGURE 6.

Figure 7:
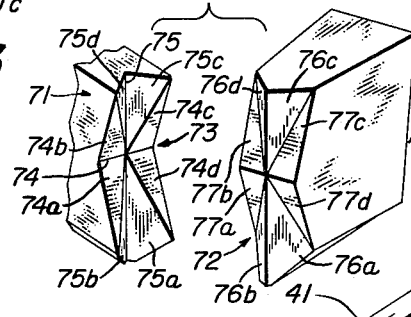
FIGURE 7 is a perspective view illustrating the complemental ends of a modified form of shank and tip.

While the forms of the invention previously shown have dealt with a pin and complemental recess type of connection, the modification of FIGURE 7 illustrates how the invention can be practiced by merely contouring the planar end surfaces of the bit and shank members.

Accordingly, in FIGURE 7, the tip 70 and shank 71 are shown having complementally contoured and planar faces that are indicated generally by the numerals 72 and 73, with it being understood that in FIGURE 7, the shank 71 is illustrated turned at right angles to its normal position so as to illustrate the detailed construction of the planar end face 73 thereof.

Considering first the construction of the end face 73 of the member 71, the invention can best be understood by first assuming that the planar end face was originally flat and perpendicular to the top surface 71a. With such a surface having been provided, the contour of end face 73 could be achieved by making right angle V-cuts having their base cut indicated by the lines 74 and 75, with the V-cut 74 defining surfaces 74a, 74b, 74c, and 74d, while the longer of the V-cuts 75 could, in turn, define surfaces 75a, 75b, 75c and 75d. These surfaces will all be disposed at compound angles with respect to the planar extent of the surface 71a.

It is to be understood that the planar surface 72 is to be complemental to the just described surface 73 and, accordingly, it is to be understood that the surfaces 76a, 76b, 76c and 76d are complemental to and respectively engage the surfaces 75a, 75b, 75c and 75d, while surfaces 77a, 77b, 77c and 77d, respectively engage with and are complemental to the surfaces 74a, 74b, 74c and 74d of tip 70.

In this fashion, when the surfaces are in registry with each other, there will be, in the absence of axial separation, which is prevented by brazing as before, an interlock against relative transverse shifting of the tip 70 with respect to the shank 71.

Much in the same manner that the cooling of an ice cube is increased by providing a hole, it will be seen that an increased surface area will be provided by the compounded surfaces just described so as to give a greater surface area of brazing and, accordingly, effectuate a stronger and more rigid point. In this regard, it is, of course, to be understood that configurations and contouring of the planar surfaces could be done in other fashions within the scope of this disclosure.

Thus, it will be seen that the matched and mated surfaces that have been described in connection with this modification do, in fact, serve a dual purpose. First, the same properly align the bit with respect to the shank to minimize machining operations and secondly, the same provide a far greater surface area to present a stronger unit.

Referring next to the modified form of the invention shown in FIGURES 8, 9 and 10, it will first be noted that this modified form of the invention teaches the use of a shank 80 that has a top surface 81, opposed side surfaces 82, 83, and a V-shaped bottom surface 84, with the top surface 81 and the side surfaces 82 and 83 being undercut to define the seat or pocket that is generally designated by the numeral 85, and with the pocket 85 including a horizontal support surface 85a and an end wall 85b that serve as points of support for the cutting insert 90.

For the purpose of providing a point of connection with the cutting insert 90, the support face 85 is shown having provided therein identical sockets 86, 86 with two such sockets being shown provided in the modified form of the invention shown in FIGURES 8 through 10. The construction of the socket members 86 is best shown in FIGURES 9 and 10 of the drawings, wherein each socket member 86 is shown as including a straight wall bore portion 87 that is preferably perpendicular to the surface 85a. The inner end of each socket 86, by virtue of being drilled, will further normally include a tapering dish-shaped bottom wall 88, with the configuration of this bottom wall being clearly shown in FIGURES 9 and 10 of the drawings. Finally, the front edge of the shank member 80 is defined by front wall 89, while the rear portion of shank 80 is defined by the rear wall 89a.

Turning next to a consideration of the insert member 90, it will be first noted that the same is of wafer-like configuration so as to be received in seated position on the pocket 85 as clearly shown in FIGURES 9 and 10 of the drawings.

Accordingly, and to this end, the insert 90, preferably of carbide material as contrasted to the steel material of shank 80, is of generally rectangular configuration and includes top and bottom walls 91 and 92, respectively, as well as rear and front walls 93 and 94, respectively. The opposed side walls 95 and 96 flare outwardly from their point of connection with the rear wall 93 to their point of forward connection with the front wall 94, to thus make the cutting tip 90 slightly wedge-shaped in plan. In this regard, the rear wall 93 has a planar dimension that is only slightly greater in transverse width than the planar dimension of the wall 85b, while the front wall 94 has a planar width dimension that exceeds considerably the width of the face 89. Further, the longitudinal length of the tip 90 exceeds the length of the pocket 85 so that a slight overhang is created as shown in FIGURE 9, with it also being noted that the wall 94 is tapered so as to provide cutting clearance in known fashion. It will also be noted from FIGURE 9 that the surfaces 91 and 81 are coplanar when the component parts are assembled as shown in FIGURES 9 and 10.

For the purpose of providing a point of connection with the shank member 80, the cutting insert 90 further includes a pair of integral peg members 100, 100 that are longitudinally aligned along the center of the tip 80 and which project downwardly from the surface 92 thereof for insertion within the previously described socket members 86, 86.

Because of the fact that different grades of carbide will contract to different degrees during molding of carbide, it has been found expedient to make the pegs 100, 100 slightly undersize with respect to the diameter of the openings 86, 86 within which the same are received. Also for the purpose of facilitating withdrawal from the carbide mold, these pegs are shown formed of tapering configuration. In this regard and by such construction, it is believed apparent that several grades of carbide can be used with standard shanks, notwithstanding the fact that the center-to-center distance of some carbide cutting tips will vary slightly with respect to the center-to-center distance of other grades of carbide. By thus making the openings in the steel shanks slightly oversize, there is provided a situation where this variation in center-to-center dimension between the pegs of various grades of carbide tips can be accommodated.

Turning now to the modified form of the invention shown in FIGURES 11, 12 and 13, it will be noted that the wafer type of construction employed in conection with FIGURES 8, 9 and 10 above described is again employed, with the only difference being a different type of pin and socket connection between the tip and shank. Accordingly, redescription of the shank 80 and the tip 90 will not be repeated, with it being understood that the structure of these components will be identical to that above described in connection with FIGURES 8 through 10, with the exception of the pin and socket means which will now be described.

Accordingly, and referring to FIGURES 11 through 13, it will first be noted that a single pin and socket connection replaces the pair of pins and sockets that were provided in FIGURES 8 through 10. Accordingly and referring to FIGURES 11 and 12, it will be first noted that an elongated oval-shaped socket 110 is provided on face 85a, with this socket 110 having straight walls 111 as shown clearly in FIGURE 11 in the drawings.

The peg means employed on the cutting tip 90 also include a peg 120 also of oval configuration, but being slightly less in longitudinal dimension than the longitudinal dimension of the socket 110. In this fashion, shrinkage differences between different grades of carbide can be compensated so that all grades of carbide can be utilized with the clearance being provided longitudinally so that in all events the carbide will remain centered with respect to the longitudinal dimension of the shank. It will be further noted that the provision of an oval configuration also precludes the possibility of rotation around the point of support in the socket 11, with this possibility also being obviated by the abutted contact between the end walls 93 and 85b.

With reference to FIGURES 8 through 13 that have just been described, it is also to be noted that these forms of the invention contemplate brazing of the insert to the shank, with silver solder being employed as previously described, and with the brazing being conducted in known fashion to effectuate a permanent attachment of these component parts together for machine shop usage.

It will be seen from the foregoing how there has been provided a new and improved type of insert bit that is characterized by the presence of interlocking means that serve to rigidly support the cutting portion of the tool with respect to the shank portion thereof, with the joint, or point of connection, between the top and shank being strengthened by virtue of the increased surface area, and with the principle of interlocking being adaptable to end abutting cutting tips or wafer type cutting tips that are received in a pocket, as is the instance in connection with FIGURES 8 through 13 of the drawings.

It will also be shown how the provision of an oversized socket permits this socket to receive pegs of varying dimensions that result from the molding of different grades of carbide.

It is also to be understood that this concept of providing oversized socket is equally utilizable with the forms of the invention shown in FIGURES 1 through 7.

While a full and complete description of the invention has been set forth in accordance with the dictates of the patent statutes, it is to be understood that this invention is not intended to be limited to the specific embodiments herein shown, and accordingly, modifications of the invention may be resorted to without departing from the spirit hereof or the scope of the appended claims.

What is claimed is:
1. An elongated pencil-like cutting insert bit of the character described, comprising:
 (1) an elongate shank having a top surface;
 (2) a relatively shorter elongate cutting tip disposed on one end of said shank;
 (3) means for aligning and securing said cutting tip to said shank for coextensive projection with respect to said top surface of said shank at one end thereof, with said means including
  (A) complemental pin and socket means defined by said tip and said shank
   (1) with said socket means being oversize with respect to said pin means,
    (a) whereby a void is provided between said pin and socket means; and
  (B) brazing material interposed between said tip and said shank in said void and covering the abutting surfaces thereof and the pin and socket means provided thereon.

2. The device of claim 1 further characterized by the presence of a bit receiving pocket provided at the forward upper edge of said shank; said tip having substantially parallel top and bottom surfaces with the space between said top and bottom surfaces of said tip corresponding to the depth of said pocket, whereby said tip may be received in said pocket in aligned relationship to said shank.

3. The device of claim 1 further characterized by the fact that said pin means project a distance equal to or less than the depth of said socket means whereby insertion of said pin means into said socket means will permit said cutting tip to abut said shank.

4. The device of claim 1 further characterized by the fact that said pin and socket means are oval shaped in planar configuration, with said pin tapering during its outward projection.

5. The device of claim 4 further characterized by the fact that the walls of said socket are perpendicular to the surface within which the same are provided, whereby an unequal void is provided between said pin and socket means.

References Cited by the Examiner

UNITED STATES PATENTS

| | | | |
|---|---|---|---|
| 828,033 | 8/1906 | Lachman | 78—82 |
| 1,974,215 | 9/1934 | Kilmer | 29—95 |
| 2,737,705 | 3/1956 | Novkov | 29—96 |
| 2,846,756 | 8/1958 | Novkov | 29—96 |

FOREIGN PATENTS

| | | |
|---|---|---|
| 140,010 | 3/1920 | Great Britain. |
| 782,425 | 9/1957 | Great Britain. |

WILLIAM W. DYER, Jr., *Primary Examiner.*

H. L. HINSON, *Assistant Examiner.*